United States Patent
Asada

(10) Patent No.: US 10,855,374 B2
(45) Date of Patent: Dec. 1, 2020

(54) RELAY DEVICE, MONITORING SYSTEM AND MONITORING INFORMATION TRANSMISSION METHOD

(71) Applicant: NEC Corporation, Tokyo (JP)

(72) Inventor: Hideo Asada, Tokyo (JP)

(73) Assignee: NEC CORPORATION, Tokyo (JP)

(*) Notice: Subject to any disclaimer, the term of this patent is extended or adjusted under 35 U.S.C. 154(b) by 1 day.

(21) Appl. No.: 16/311,257

(22) PCT Filed: Jun. 29, 2017

(86) PCT No.: PCT/JP2017/023894
§ 371 (c)(1),
(2) Date: Dec. 19, 2018

(87) PCT Pub. No.: WO2018/003912
PCT Pub. Date: Jan. 4, 2018

(65) Prior Publication Data
US 2019/0190603 A1 Jun. 20, 2019

(30) Foreign Application Priority Data
Jul. 1, 2016 (JP) .................. 2016-131470

(51) Int. Cl.
*H04J 14/00* (2006.01)
*H04B 10/29* (2013.01)
(Continued)

(52) U.S. Cl.
CPC ........... *H04B 10/29* (2013.01); *H04B 10/077* (2013.01); *H04B 10/079* (2013.01);
(Continued)

(58) Field of Classification Search
CPC .............. H04B 10/29; H04B 10/077
See application file for complete search history.

(56) References Cited

U.S. PATENT DOCUMENTS 5,790,289 A * 8/1998 Taga ................... H04J 14/0221
398/26
5,995,254 A * 11/1999 Koga .................... H04B 10/07
398/1
(Continued)

FOREIGN PATENT DOCUMENTS

CN 104753585 A 7/2015
JP S61-39735 A 2/1986
(Continued)

OTHER PUBLICATIONS

Extended European Search Report for EP Application No. EP17820266.9 dated Jun. 14, 2019.
(Continued)

*Primary Examiner* — David C Payne
*Assistant Examiner* — Pranesh K Barua

(57) ABSTRACT

Provided is a technology for simultaneously monitoring a plurality of relay devices. A relay device 1 comprises a superimposing unit 2 and a monitor unit 3. The relay device 1 is interposed on an optical transmission path between optical communication devices that send and receive an optical signal, and has a function for relaying the optical signal flowing through the optical transmission path. The monitor unit 3 monitors the operation status of the relay device 1. At a predetermined timing, the superimposing unit 2 superimposes monitor unit 3 monitoring-information onto an optical signal of a primary signal flowing through the optical transmission path, by performing modulation processing on the basis of an oscillation signal having a predetermined oscillation frequency. The relay device 1 can spontaneously superimpose the monitoring information onto an optical signal and transmit same.

7 Claims, 8 Drawing Sheets

(51) Int. Cl.
*H04B 17/40* (2015.01)
*H04B 10/079* (2013.01)
*H04B 10/077* (2013.01)
*H04L 29/14* (2006.01)
*H04B 10/516* (2013.01)
*H04Q 11/00* (2006.01)

(52) U.S. Cl.
CPC ......... *H04B 10/516* (2013.01); *H04B 17/40* (2015.01); *H04L 69/40* (2013.01); *H04Q 11/0062* (2013.01); *H04Q 2011/0083* (2013.01)

(56) References Cited

U.S. PATENT DOCUMENTS

| | | | | |
|---|---|---|---|---|
| 6,563,979 | B2* | 5/2003 | Feinberg | H04J 14/0294 385/15 |
| 7,340,187 | B2* | 3/2008 | Takeshita | H04B 10/0795 375/316 |
| 8,290,361 | B2* | 10/2012 | Nakano | H04J 14/0275 398/9 |
| 2002/0154370 | A1* | 10/2002 | Ishii | H04B 10/0779 398/177 |
| 2003/0011855 | A1* | 1/2003 | Fujiwara | H04B 10/0777 398/177 |
| 2003/0035184 | A1* | 2/2003 | Deguchi | H04B 10/298 398/177 |
| 2014/0186021 | A1* | 7/2014 | Striegler | H04B 10/03 398/2 |

FOREIGN PATENT DOCUMENTS

| | | |
|---|---|---|
| JP | H05-130058 A | 5/1993 |
| JP | H08-46579 A | 2/1996 |
| JP | H08-298486 A | 11/1996 |
| JP | H09-18410 A | 1/1997 |
| JP | 2002-319898 A | 10/2002 |
| JP | 2003-032192 A | 1/2003 |
| JP | 2012-074782 A | 4/2012 |

OTHER PUBLICATIONS

International Search Report for PCT Application No. PCT/JP2017/023894, dated Sep. 19, 2017.
English translation of Written opinion for PCT Application No. PCT/JP2017/023894.

* cited by examiner

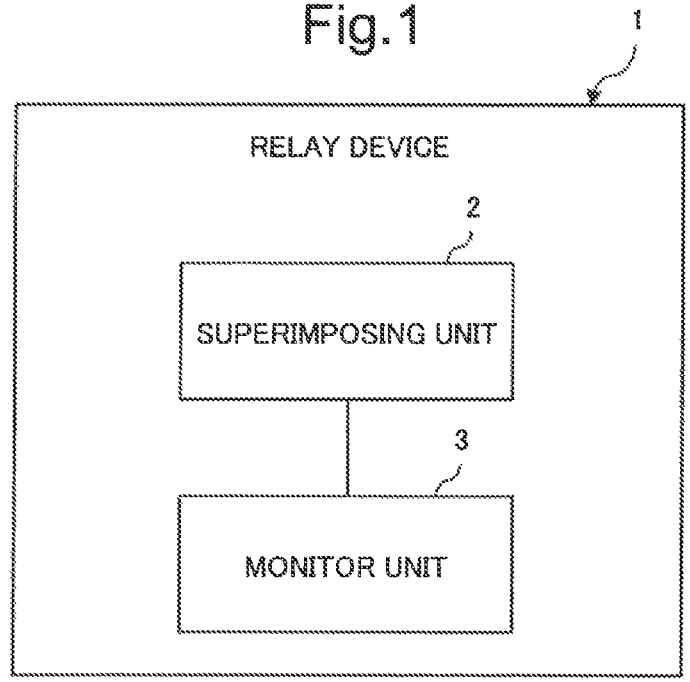
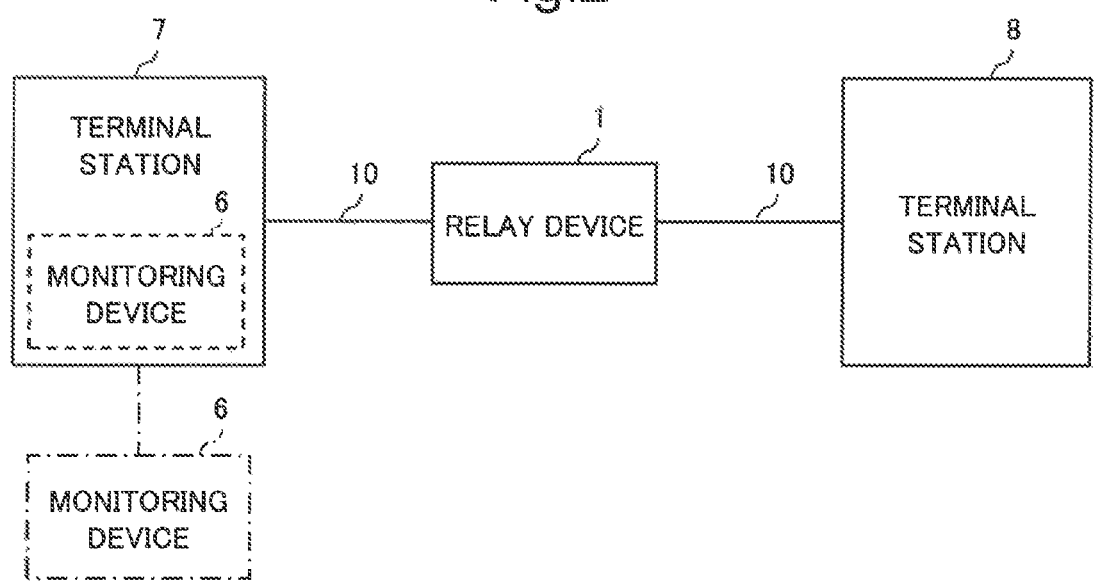

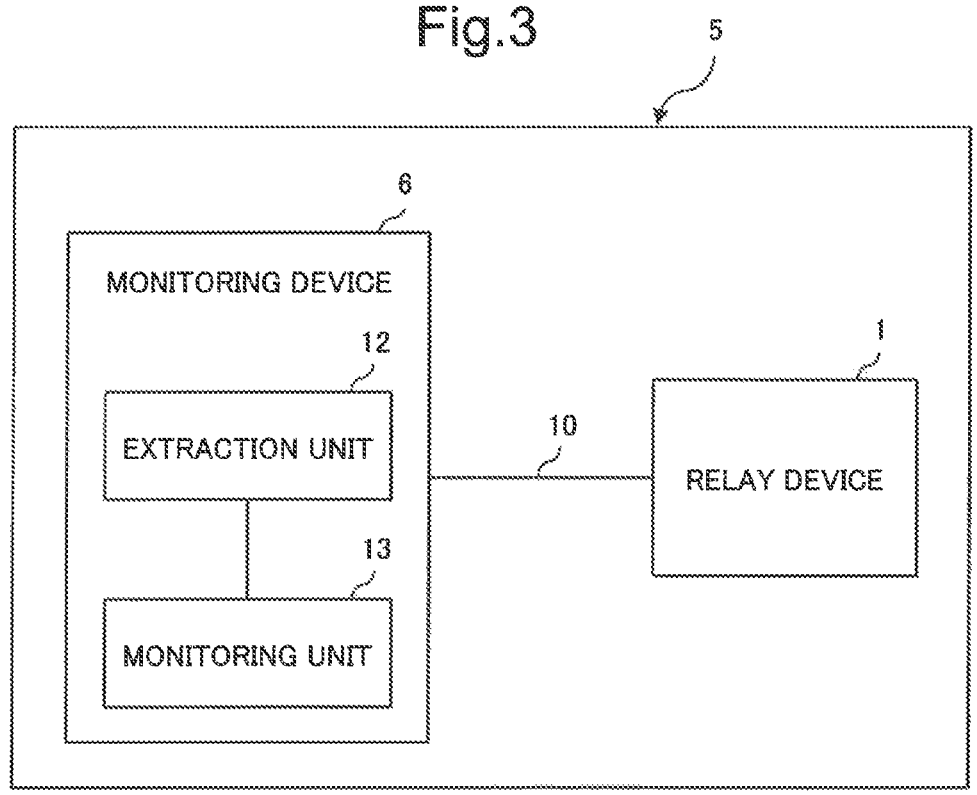

RELAY DEVICE, MONITORING SYSTEM AND MONITORING INFORMATION TRANSMISSION METHOD

This application is a National Stage Entry of PCT/JP2017/023894 filed on Jun. 29, 2017, which claims priority from Japanese Patent Application 2016-131470 filed on Jul. 1, 2016, the contents of all of which are incorporated herein by reference, in their entirety.

TECHNICAL FIELD

The present invention relates to a technology for monitoring a relay device that relays an optical signal.

BACKGROUND ART

As illustrated in FIG. 9, there may be interposed a plurality of repeaters (relay stations) 57 that amplify an optical signal on a transmission path provided from an optical communication device (terminal station) 55 which generates and transmits an optical signal through an optical fiber 60 to an optical communication device (terminal station) 56 as a destination of the optical signal. Systems have been proposed for monitoring such a repeater 57 (refer to Patent Literature 1 and 2). For example, in one of the proposed systems, the optical communication device 55 superimposes a command signal involved in monitoring of the repeater 57 onto a primary signal, that is, a signal containing information of a transmission object and transmits an optical signal of the superimposed signal. The command signal contains information on the destination representing the repeater 57 that relays the signal.

The repeater 57, when detecting that the optical signal includes the command signal destined to the own repeater 57, extracts the command signal from the optical signal. The repeater 57 superimposes, as a response signal, a signal indicating its device state in response to the command signal onto an optical signal of the primary signal and outputs the optical signal, for example, toward the optical communication device 56. The optical communication device 56 extracts the response signal from the optical signal received. Based on the extracted response signal, the operation status or an abnormality of the repeater 57 is monitored.

PTL 3 relates to a method for monitoring and controlling a radio relay station and PTL 3 discloses a system where a monitoring central station collectively monitors radio relay stations.

CITATION LIST

Patent Literature

[PTL 1] Japanese Unexamined Patent Application Publication No. H09 (1997)-18410
[PTL 2] Japanese Unexamined Patent Application Publication No. H08 (1996)-298486
[PTL 3] Japanese Unexamined Patent Application Publication No. H08 (1996)-46579

SUMMARY OF INVENTION

Technical Problem

In the aforementioned repeater monitoring systems, the terminal station 55 superimposes the command signal onto a signal to be transmitted to the destination terminal station 56 via the repeater 57 to be monitored and the repeater 57 to be monitored transmits the response signal in response to the command signal. Based on the response signal, the operation status or the abnormality of the repeater 57 to be monitored is monitored.

In such a configuration, when a plurality of repeaters 57 are interposed on the optical transmission path, each repeater 57 receives the command signal at a different timing and thus receives the response signal in response to the command signal at a different timing. As a result, it is difficult for the system having such a configuration to perform precise simultaneous monitoring of the plurality of repeaters 57.

The invention has been developed in order to solve the above problems. In other words, a main object of the invention is to provide a technology that can monitor a relay device interposed on an optical transmission path, and in particular, simultaneously monitor a plurality of relay devices.

Solution to Problem

To achieve the main object, a relay device of an example embodiment according to the present invention includes:
a monitor unit that monitors an operation status of the relay device; and
a superimposing unit that superimposes monitoring information acquired by the monitor unit onto an optical signal of a primary signal at a predetermined timing by performing modulation processing based on an oscillation signal having a predetermined oscillation frequency. The primary signal is an optical signal that flows through an optical transmission path between terminal stations as optical communication devices which transmit and receive the optical signal and contains information of a transmission object.

A monitoring system of a relay device of an example embodiment according to the present invention includes:
the above mentioned relay device;
an extraction unit that extracts the monitoring information from an optical signal containing the monitoring information of the relay device superimposed through passing the relay device; and
a monitoring unit that monitors the relay device based on the monitoring information extracted by the extraction unit.

A method for transmitting monitoring information of an example embodiment according to the present invention, includes:
monitoring an operation status of a relay device that relays an optical signal flowing through an optical transmission path between terminal stations as optical communication devices that transmit and receive the optical signal;
superimposing monitoring information based on the monitoring operation onto the optical signal of a primary signal at a predetermined timing by performing modulation processing based on an oscillation signal having a predetermined oscillation frequency, the primary signal being an optical signal which flows through an optical transmission path between terminal stations and containing information of a transmission object; and
transmitting the optical signal containing the monitoring information toward monitoring means for monitoring the relay device.

Advantageous Effects of Invention

According to the invention, it is possible to monitor a relay device interposed on an optical transmission path, and in particular to monitor simultaneously a plurality of relay devices.

BRIEF DESCRIPTION OF DRAWINGS

FIG. 1 is a block diagram of a simplified configuration of a relay device according to a first example embodiment of the present invention.

FIG. 2 illustrates an example of an optical transmission system including the relay device.

FIG. 3 illustrates a configuration of a monitoring system that monitors the relay device according to the first example embodiment.

EXAMPLE EMBODIMENT

Figure 4:
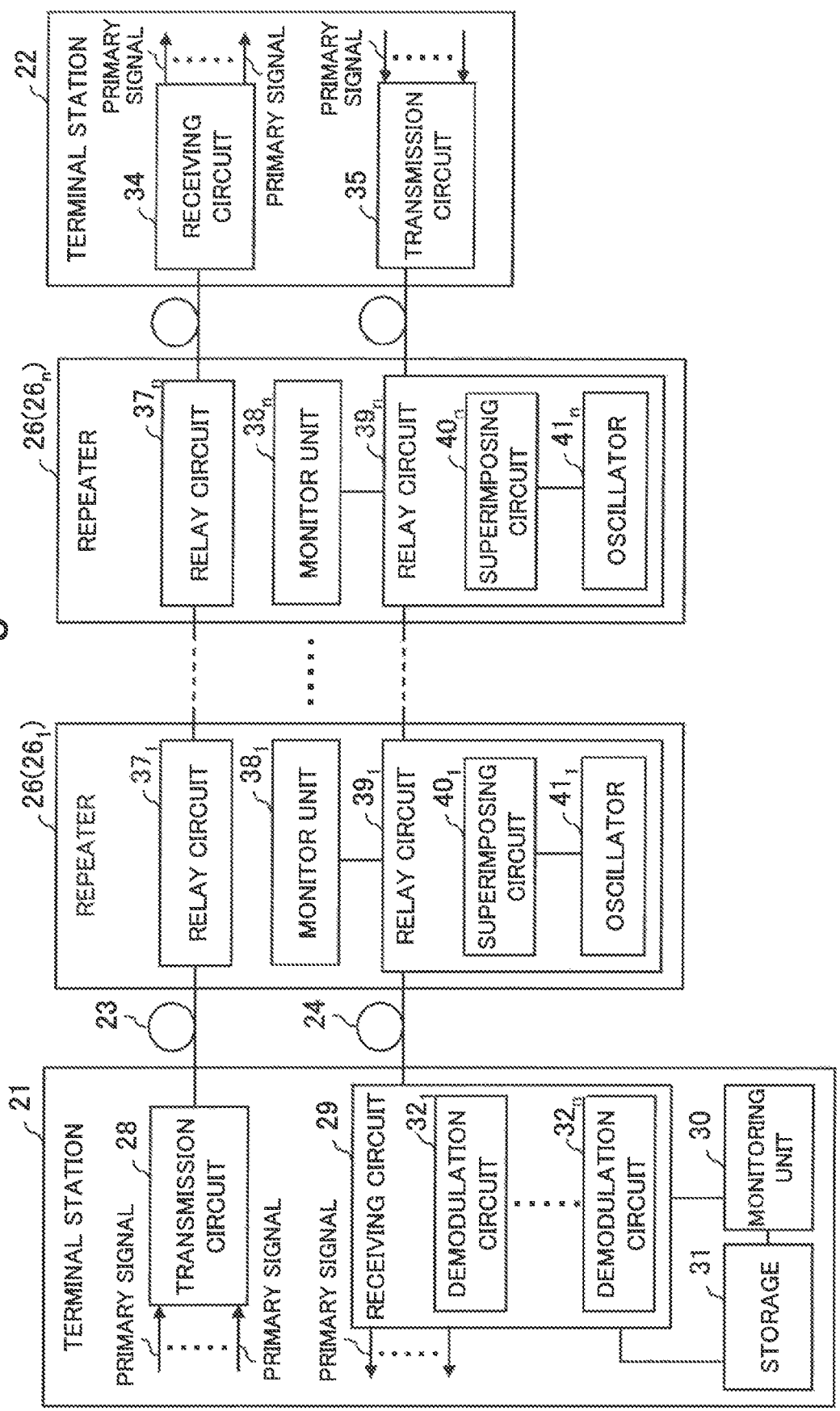
FIG. 4 illustrates an optical transmission system including a relay device (repeater) according to a second example embodiment of the present invention.

Example embodiments of the present invention will be described in reference to attached drawings.

First Example Embodiment

FIG. 1 is a block diagram of a simplified configuration of a relay device according to a first example embodiment of the present invention. A relay device 1 of the first example embodiment is interposed on an optical transmission path 10 between terminal stations 7 and 8 as optical communication devices that transmit and receive an optical signal, as illustrated in FIG. 2. The relay device 1 includes a function to relay the optical signal flowing through the optical transmission path 10. Operation status of the relay device 1 is monitored by a monitoring device 6 built into or connected to the terminal station 7. As illustrated in FIG. 3, the relay device 1 and the monitoring device 6 constitute a monitoring system 5.

The relay device 1 of the first example embodiment includes a superimposing unit 2 and a monitor unit 3, as illustrated in FIG. 1. The monitor unit 3 includes a function to monitor the operation status of the own relay device 1. The superimposing unit 2 includes a function to superimpose monitoring information acquired by the monitor unit 3, at a predetermined timing, onto an optical signal of a primary signal flowing through the optical transmission path 10, by performing modulation processing based on an oscillation signal having a predetermined oscillation frequency. Note that the primary signal is a signal that contains information of a transmission object to be transmitted from the terminal station 7 to the terminal station 8 or vice versa and, when converted to the optical signal, the primary signal is transmitted on the optical transmission path 10 (for example, an optical fiber). In this example embodiment, the superimposing unit 2 superimposes the monitoring information onto one or both of the primary signal transmitted from the terminal station 7 to the terminal station 8 and the primary signal transmitted from the terminal station 8 to the terminal station 7. The monitoring information includes information on the detected operation status of the relay device 1 that is associated with information on the time the operation status was detected.

The monitoring device 6 includes an extraction unit 12 and a monitoring unit 13, as illustrated in FIG. 3. The extraction unit 12 includes a function to extract, in the other words, demodulate, from the optical signal that has flowed through the relay device 1, the monitoring information superimposed onto the primary signal by the superimposing unit 2 of the relay device 1. The monitoring unit 13 includes a function to monitor the operation status of the relay device 1 to be monitored using the monitoring information extracted by the extraction unit 12.

Note that the extraction unit 12 may be configured inside the terminal station 7 and the monitoring unit 13 may be arranged outside the terminal station 7.

The relay device 1 of the first example embodiment is configured to transmit spontaneously the operation status of the relay device 1 toward the monitoring device 6 and is not configured, for example, to return the operation status of the relay device 1 toward the monitoring device 6 in response to a control signal received from a monitoring device. Thus, when a plurality of relay devices 1 are interposed on the optical transmission path 10 between the terminal stations 7 and 8, it is possible for each relay device 1 to transmit equal-time monitoring information acquired by the monitor unit 3 toward the monitoring device 6. The monitoring device 6 can simultaneously monitor a plurality of relay devices 1 based on the equal-time monitoring information. In short, the relay device 1 and the monitoring system 5 of the relay device 1 can simultaneously monitor the plurality of relay devices 1 arranged between the terminal stations 7 and 8.

In the first example embodiment, the monitoring information is transmitted from the relay device 1 to the monitoring device 6 while superimposed onto the optical signal of the primary signal. Thus, the monitoring system 5 need not provide a dedicated transmission path (channel) for transmitting the monitoring information from the relay device 1 to the monitoring device 6, and therefore prevents complicated configuration related to transmission of information in a system.

Further, the monitoring system 5 of the first example embodiment does not employ a configuration where the monitoring device issues a command to request monitoring information and the relay device 1 returns the monitoring information in response to the command. This reduces a system load related to transmission of the monitoring information.

Second Example Embodiment

A second example embodiment of the present invention will be described below.

FIG. 4 is a block diagram of simplified configurations of a repeater as a relay device according to the second example embodiment of the present invention and an optical transmission system including a monitoring system for monitoring the repeater. The optical transmission system illustrated in FIG. 4 includes a downstream terminal station 21, an upstream terminal station 22, and a plurality of repeaters 26 ($26_1, \ldots 26_n$ (n being an integer equal to 2 or above)).

The downstream and upstream terminal stations 21, 22 are optical communication devices each having a function to convert an electrical signal to an optical signal, and capable of transmitting and receiving an optical signal. The terminal stations 21, 22 are connected to each other via an upstream optical transmission path 23 and a downstream optical transmission path 24. The upstream optical transmission path 23 and the downstream optical transmission path 24 are optical signal transmission paths that optically connect the terminal stations 21, 22. In other words, the upstream optical transmission path 23 is a transmission path that transmits an optical signal from the terminal station 21 to the terminal station 22 (an optical signal in this direction is hereinafter also referred to as an upstream optical signal). The downstream optical transmission path 24 is a transmission path that transmits an optical signal from the terminal station 22 to the terminal station 21 (an optical signal in this direction is hereinafter also referred to as a downstream optical signal). The upstream optical transmission path 23 and the downstream optical transmission path 24 are mainly composed of an optical fiber.

The plurality of repeaters 26 ($26_1, \ldots 26_n$) are interposed on each of the upstream optical transmission path 23 and the downstream optical transmission path 24. The repeater $26_1$ includes a relay circuit $37_1$, a monitor unit $38_1$, and a relay circuit $39_1$. The relay circuit $37_1$ includes a circuit configuration that amplifies the upstream optical signal flowing through the upstream optical transmission path 23 and transmits the amplified upstream optical signal toward the upstream terminal station 22. The monitor unit $38_1$ includes a function to monitor the operation status of the repeater $26_k$. The repeater $26_1$ may include a function (in the other words, an abnormality detection unit (not illustrated)) to issue an alarm to notify an abnormality when an abnormality of a sensor (not illustrated) of the repeater $26_1$ or the like is detected. In this example, the monitor unit $38_1$ includes a function to acquire information on the alarm issuance from the abnormality detection unit when the alarm is issued. Further, the monitor unit $38_1$ includes a function to generate and output the monitoring information using one or both of the acquired information on the operation status and information on alarm issuance. The monitoring information includes, for example, the information on the operation status associated with the information related to the detection time of the operation status. The monitoring information may include further the information on the alarm issuance associated with the issuance time of the alarm. The monitoring information may include the information on the alarm issuance associated with the issuance time of the alarm instead of the information on the operation status. Moreover, the monitor unit $38_1$ includes a function to store the generated monitoring information in a storage (not illustrated).

The relay circuit $39_1$ includes a function to amplify the downstream optical signal flowing through the downstream optical transmission path 24 and further includes a superimposing circuit (superimposing unit) $40_1$ and an oscillator $41_1$. The oscillator $41_1$ includes a circuit configuration that generates the oscillation signal having a different oscillation frequency for each of the repeaters 26. For example, the oscillation frequency Fn of the oscillation signal generated by the oscillator $41_1$-$41_n$ is determined from an equation Fn=Fs+Δk×(n−1). Note that Fs in the formula represents a predetermined basic oscillation frequency and Δk represents a predetermined factor (fixed value). n represents an identification number assigned to each oscillator $41_1$-$41_n$. In this example, a first oscillator 41 of the repeater 26 that is closest to the downstream terminal station 21 is assigned "1" and each oscillator 41 is assigned an integer incremented by "1" as being distant in the upstream direction from the first oscillator 41.

The superimposing circuit $40_1$ includes a circuit configuration that superimposes the monitoring information output from the monitor unit $38_1$ onto the optical signal of the primary signal flowing through the downstream optical transmission path 24 by performing modulation processing based on the oscillation signal of the oscillator $41_1$. Note that the primary signal is a signal containing information of a transmission object to be transmitted between the terminal stations 21 and 22. The timing at which the superimposing circuit $40_1$ superimposes the monitoring information is a timing appropriately specified in consideration of specifications related to monitoring of the repeater 26 or the like, and is not particularly limited. In addition, while this example assumes the optical transmission system where the primary signal continuously flows through the downstream optical transmission path 24, when an optical transmission system is used where the primary signal intermittently flows through the downstream optical transmission path 24, the repeater 26 may further include a detection unit (not illustrated) described below. The detection unit includes a configuration that detects that the primary signal is flowing through the downstream optical transmission path 24. When the repeater 26 includes the detection unit, the superimposing circuit $40_1$-$40_n$ superimposes the monitoring information onto the primary signal flowing through the downstream optical transmission path 24 when the detection unit has detected that the primary signal is flowing through the downstream optical transmission path 24.

In other words, the relay circuit $39_1$ includes a function to amplify the downstream optical signal that has flowed through the downstream optical transmission path 24 from the terminal station 22 and transmit the optical signal containing the monitoring information acquired by the monitor unit $38_1$ superimposed thereon toward the terminal station 21.

The repeater $26_1$ includes the aforementioned configuration. Any one of the other repeaters 26 includes a similar configuration.

The upstream terminal station 22 includes a receiving circuit 34 and a transmission circuit 35. The receiving circuit 34 includes a circuit configuration to convert the optical signal received from the upstream optical transmission path 23 to an electrical signal and output the primary signal as the electrical signal. Note that, when the upstream optical transmission path 23 is a transmission path that transmits the optical signal composed of a plurality of multiplexed optical signals individually related to a plurality of channels, the receiving circuit 34 includes a circuit configuration to demultiplex the optical signal for each channel and output the primary signal for each channel.

The transmission circuit 35 includes a circuit configuration to convert the primary signal as the electrical signal to the optical signal and output the optical signal to the downstream optical transmission path 24. Note that, when the downstream optical transmission path 24 is a transmission path that can transmit the optical signal of the plurality of channels, the transmission circuit 35 includes a circuit configuration to generate the optical signal composed of the plurality of multiplexed (mixed) optical signals.

The downstream terminal station 21 includes a transmission circuit 28, a receiving circuit 29, and a monitoring unit 30. The transmission circuit 28 includes a circuit configuration similar to that of the transmission circuit 35 of the upstream terminal station 22 and is configured to output the generated optical signal to the upstream optical transmission path 23.

The receiving circuit 29 includes a circuit configuration similar to that of the receiving circuit 34 of the upstream terminal station 22 and includes a plurality of demodulation circuits 32$_1$, . . . 32$_n$ (n being an integer equal to 2 or above) serving as extraction units. The demodulation circuits 32$_1$, . . . 32$_n$ each related individually to one of the repeaters 26$_1$-26$_n$. The demodulation circuits 32$_1$-32$_n$ includes a circuit configuration to extract the monitoring information superimposed by the related repeater 26$_1$-26$_n$ from the downstream optical signal based on the oscillation frequency Fn of the oscillator 41$_1$-41$_n$ of the related repeater 26$_1$-26$_n$. The extracted monitoring information is output from the demodulation circuit 32$_1$-32$_n$ to the monitoring unit 30 while identification information representing the related repeater 26$_1$-26$_n$ is associated thereto. The monitoring information is stored in a storage 31 while the identification information of the repeater 26$_1$-26$_n$ is associated thereto.

The monitoring unit 30 includes a function to monitor centrally the operation status of the repeater 26$_1$-26$_n$, based on the above-mentioned monitoring information. The function to monitor the device uses a variety of techniques and the monitoring unit 30 monitors the operation status of the repeater 26$_1$-26$_n$ by using an appropriately selected technique.

In the second example embodiment, there is configured a monitoring system where a repeater 26$_1$-26$_n$, a demodulation circuit 32$_1$-32$_n$ of the downstream terminal station 21, and the monitoring unit 30 monitor the operation status of the repeater 26$_1$-26$_n$.

The monitoring system of the second example embodiment includes the aforementioned configuration and thus can centrally monitor the plurality of repeaters 26$_1$-26$_n$. Further, as described in the first example embodiment, each repeater 26$_1$-26$_n$ spontaneously transmits the monitoring information and thus the monitoring unit 30 can reference the equal-time monitoring information in each repeater 26$_1$-26$_n$. This allows the monitoring system of the second example embodiment to monitor simultaneously the repeaters 26$_1$-26$_n$.

The monitoring system according to the second example embodiment includes a configuration to superimpose the monitoring information onto the downstream optical signal by performing the modulation processing based on the oscillation signal having a different oscillation frequency Fn for each repeater 26$_1$-26$_n$. This allows the monitoring system to transmit a plurality of pieces of monitoring information by way of a common downstream optical signal to the downstream terminal station 21.

Further, the monitoring system according to the second example embodiment includes the aforementioned configuration thus obtaining an effect of preventing complicated configuration related to transmission of the monitoring information and an effect of reducing the system load related to transmission of the monitoring information, in a similar way to the first example embodiment.

Third Example Embodiment

A third example embodiment according to the present invention will be described below. Note that, in the description of the third example embodiment, similar reference numerals are given to the similar name portion as the constituent parts of the system described in the second example embodiment and repeated description is omitted of the common parts.

Figure 5:
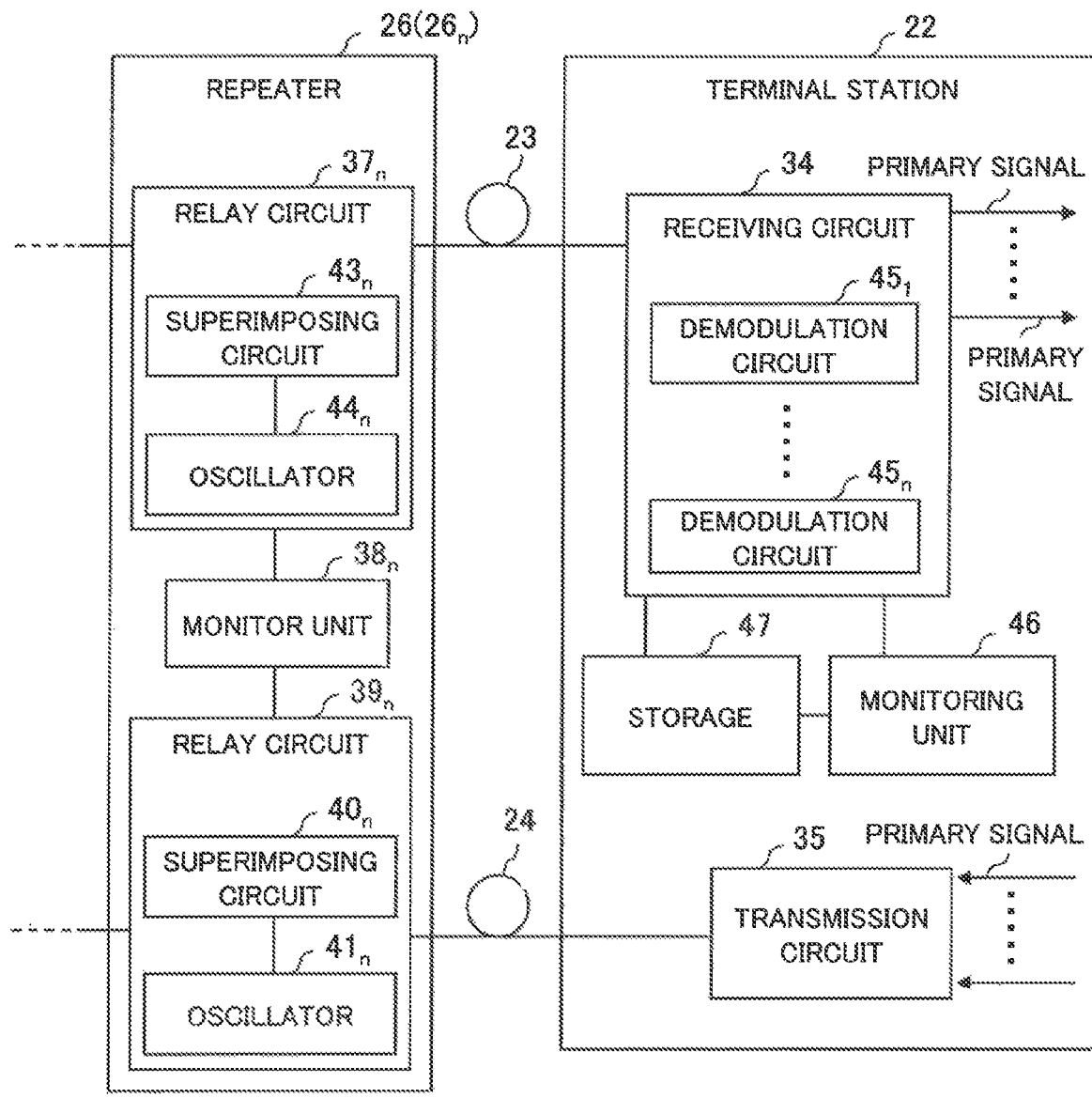
FIG. 5 illustrates a configuration of a relay device (repeater) according to a third example embodiment of the present invention and an optical transmission system including the relay device.

FIG. 5 is a block diagram of characteristic components of the repeater 26 and its monitoring system according to the third example embodiment. In the third example embodiment, the relay circuit 37$_1$-37$_n$ of the repeater 26$_1$-26$_n$ that relays the upstream optical signal flowing through the upstream optical transmission path 23 includes the configuration of the second example embodiment as well as the superimposing circuit (superimposing unit) 43$_1$-43$_n$ and the oscillator 44$_1$-44$_n$. The monitor unit 38$_1$-38$_n$ includes a function to output the monitoring information to the relay circuit 39$_1$-39$_n$ as well as the relay circuit 37$_1$-37$_n$.

The oscillator 44$_1$-44$_n$ includes, in a similar way to the oscillator 41$_1$-41$_n$, a circuit configuration to generate the oscillation signal having the oscillation frequency individually related to each repeater 26$_1$-26$_n$.

The superimposing circuit 43$_1$-43$_n$ includes a circuit configuration to superimpose the monitoring information output from the monitor unit 38$_1$-38$_n$ onto the upstream optical signal of the primary signal flowing through the upstream optical transmission path 23 by performing modulation processing based on the oscillation signal of the oscillator 41$_1$-41$_n$. The superimposing circuit 43$_1$-43$_n$ superimposes, in a similar way to the superimposing circuit 40$_1$-40$_n$, the monitoring information output from the monitor unit 38$_1$-38$_n$, at an appropriately specified timing. In addition, while this example assumes an optical transmission system where the primary signal continuously flows through the upstream optical transmission path 23, when an optical transmission system is used where the primary signal intermittently flows through the upstream optical transmission path 23, the repeater 26 may include a detection unit (not illustrated) that detects the primary signal flowing through the upstream optical transmission path 23. When the repeater 26 includes the detection unit, the superimposing circuit 43$_1$-43$_n$ superimposes the monitoring information onto the primary signal flowing through the upstream optical transmission path 23 when the detection unit has detected that the primary signal is flowing through the upstream optical transmission path 23.

Note that, while the relay circuit 37$_1$-37$_n$ includes the oscillator 44$_1$-44$_n$ in the third example embodiment, the oscillator 44$_1$-44$_n$ may be omitted and the oscillation signal of the oscillator 41$_1$-41$_n$ may be supplied to the superimposing circuit 40$_1$-40$_n$ and the superimposing circuit 43$_1$-43$_n$.

In the third example embodiment, the receiving circuit 34 in the upstream terminal station 22 includes a demodulation circuit (extraction unit) 45$_1$-45$_n$ individually related to each repeater 26$_1$-26$_n$. The upstream terminal station 22 further includes a monitoring unit 46 and a storage 47.

The demodulation circuit 45$_1$-45$_n$ includes a circuit configuration to extract the monitoring information superimposed by the related repeater 26$_1$-26$_n$ from the upstream optical signal based on the oscillation frequency of the oscillator 44$_1$-44$_n$ of the related repeater 26$_1$-26$_n$. The extracted monitoring information is output from the demodulation circuit 45$_1$-45$_n$ to the monitoring unit 46 while identification information representing the related repeater 26$_1$-26$_n$ is associated thereto. The monitoring information is stored in the storage 47 while the identification information of the repeater 26$_1$-26$_n$ is associated thereto.

The monitoring unit 46 includes, in a similar way to the monitoring unit 30, a function to centrally monitor the operation status of the repeater $26_1$-$26_n$, based on the monitoring information extracted by the demodulation circuit $45_1$-$45_n$.

The configuration of the repeater $26_1$-$26_n$ and its monitoring system according to the third example embodiment not described above is similar to that of the second example embodiment.

In the third example embodiment, the repeater $26_1$-$26_n$, a demodulation circuit $32_1$-$32_n$, $45_1$-$45_n$ in the terminal station 21, 22, and the monitoring unit 30, 46 constitute the monitoring system. The monitoring system transmits the monitoring information of the repeater $26_1$-$26_n$ to the downstream terminal station 21 as well as the upstream terminal station 22. Thus, the monitoring system according to the third example embodiment can monitor the operation status of the repeater $26_1$-$26_n$ by using both the downstream terminal station 21 and the upstream terminal station 22. This allows the monitoring system according to the third example embodiment to obtain a similar effect to that described in the second example embodiment and further obtain the following effect. Even when the monitoring information is not successfully transmitted to one of the terminal station 21 and the terminal station 22, the monitoring information is successfully transmitted to the other and the operation status of the repeater $26_1$-$26_n$ is continuously monitored. This allows the monitoring system to enhance the reliability and stability related to monitoring of the repeater $26_1$-$26_n$.

Fourth Example Embodiment

A fourth example embodiment according to the present invention will be described below. Note that, in the description of the fourth example embodiment, similar reference numerals are given to the similar name portion as the constituent parts of the system described in the second example embodiment and repeated description is omitted of the common parts.

Figure 6:
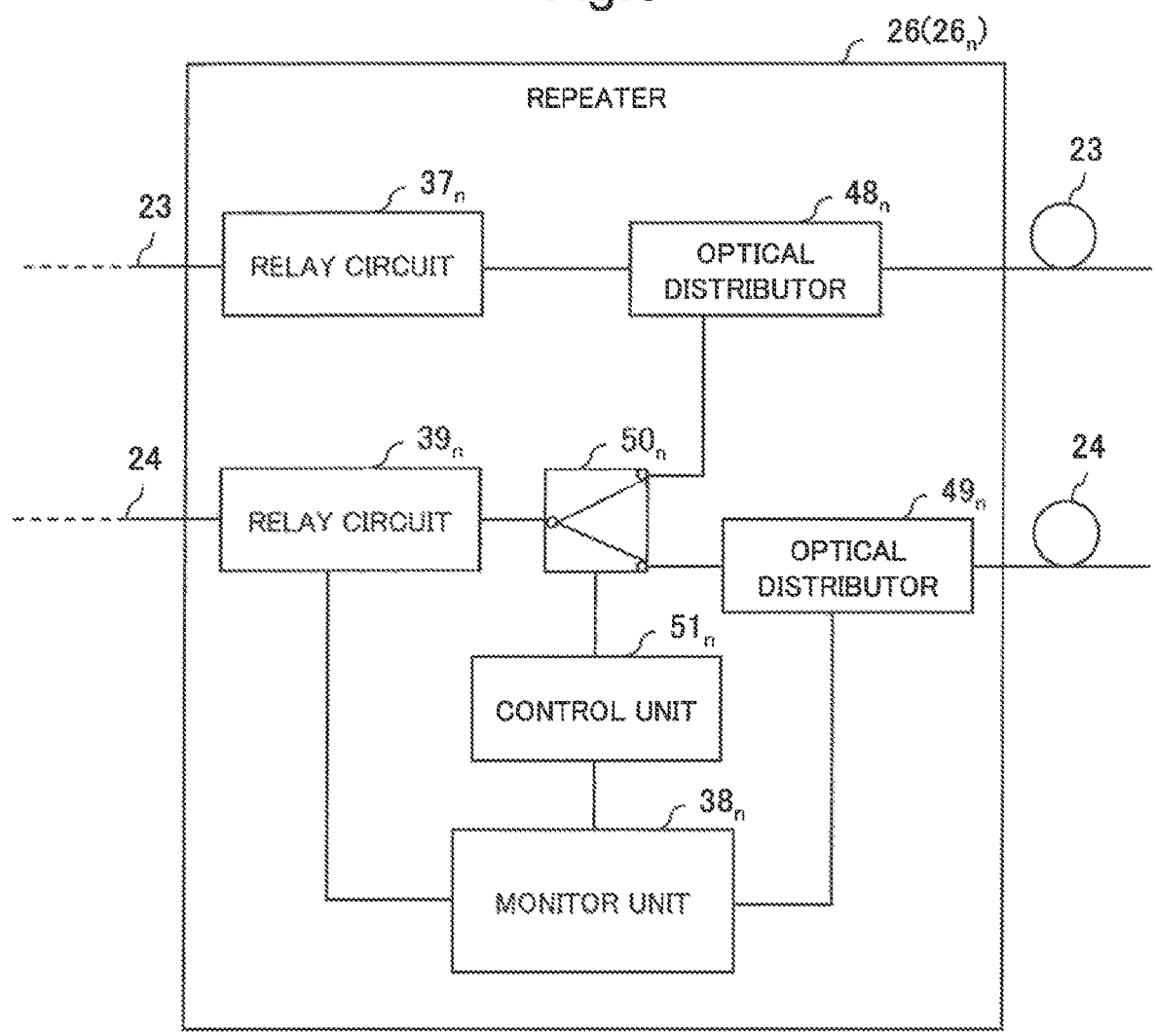
FIG. 6 is a block diagram of a simplified configuration of a relay device (repeater) according to a fourth example embodiment of the present invention.

FIG. 6 is a block diagram of a simplified configuration of a repeater according to the fourth example embodiment of the invention. In the fourth example embodiment, each repeater $26_1$-$26_n$ includes the configuration described in the second example embodiment as well as an optical distributor (Coupler (CPL)) $48_1$-$48_n$, $49_1$-$49_n$, a switch unit $50_1$-$50_n$, and a control unit $51_1$-$51_n$. The optical distributor $48_1$-$48_n$ is interposed upstream of the relay circuit $37_1$-$37_n$ on the upstream optical transmission path 23. The optical distributor $48_1$-$48_n$ is connected to the switch unit 50 via the optical transmission path (optical fiber). The optical distributor $48_1$-$48_n$ includes a line configuration (circuit) to distribute the upstream optical signal output from the relay circuit $37_1$-$37_n$ to the upstream optical transmission path (upstream terminal station) side and the switch unit side.

The optical distributor $49_1$-$49_n$ is interposed downstream of the relay circuit $39_1$-$39_n$ on the downstream optical transmission path 24. The optical distributor $49_1$-$49_n$ is connected to the monitor unit 38 via the optical transmission path (optical fiber). The optical distributor $49_1$-$49_n$ includes a line configuration (circuit) to distribute the downstream optical signal that has flowed through the downstream optical transmission path 24 to the downstream optical transmission path (downstream terminal station) and the monitor unit.

The switch unit $50_1$-$50_n$ includes an optical signal switching circuit that connects either the optical distributor $48_1$-$48_n$ or the optical distributor $49_1$-$49_n$ to the relay circuit $39_1$-$39_n$. The monitor unit $38_1$-$38_n$ further includes a function to acquire (monitor) the strength of the downstream optical signal introduced from the optical distributor $49_1$-$49_n$. Note that the monitoring information generated by the monitor unit $38_1$-$38_n$ may contain information on the strength of the downstream optical signal acquired in that manner.

The control unit $51_1$-$51_n$ includes a function to compare the strength of the downstream optical signal acquired by the monitor unit $38_1$-$38_n$ with a threshold and determine whether the strength of the downstream optical signal is equal to or smaller than the threshold. The control unit $51_1$-$51_n$ further includes a function to control the switching operation of the switch unit $50_1$-$50_n$ depending on the comparison result of the strength of the downstream optical signal and the threshold. In other words, the control unit $51_1$-$51_n$ controls the switch unit $50_1$-$50_n$ in order that the optical distributor $48_1$-$48_n$ will connect to the relay circuit $39_1$-$39_n$ when the strength of the downstream optical signal has become equal to or smaller than the threshold. Otherwise, the control unit $51_1$-$51_n$ controls the switch unit $50_1$-$50_n$ in order that the optical distributor $49_1$-$49_n$ will connect to the relay circuit $39_1$-$39_n$.

As mentioned above, the control unit $51_1$-$51_n$ controls the switch unit $50_1$-$50_n$. Even when the downstream optical signal is not input to the repeater $26_1$-$26_n$ for example due to a break in the optical fiber, part of the upstream optical signal is supplied to the downstream relay circuit $39_1$-$39_n$. This allows the relay circuit $39_1$-$39_n$ to amplify the upstream optical signal and generate the optical signal where the monitoring information of the monitor unit $38_1$-$38_n$ is superimposed onto the upstream optical signal, and output the optical signal toward the downstream terminal station 21 via the downstream optical transmission path 24.

The configuration of the repeater $26_1$-$26_n$ and its monitoring system according to the fourth example embodiment not described above is similar to that of the second example embodiment.

Figure 7:
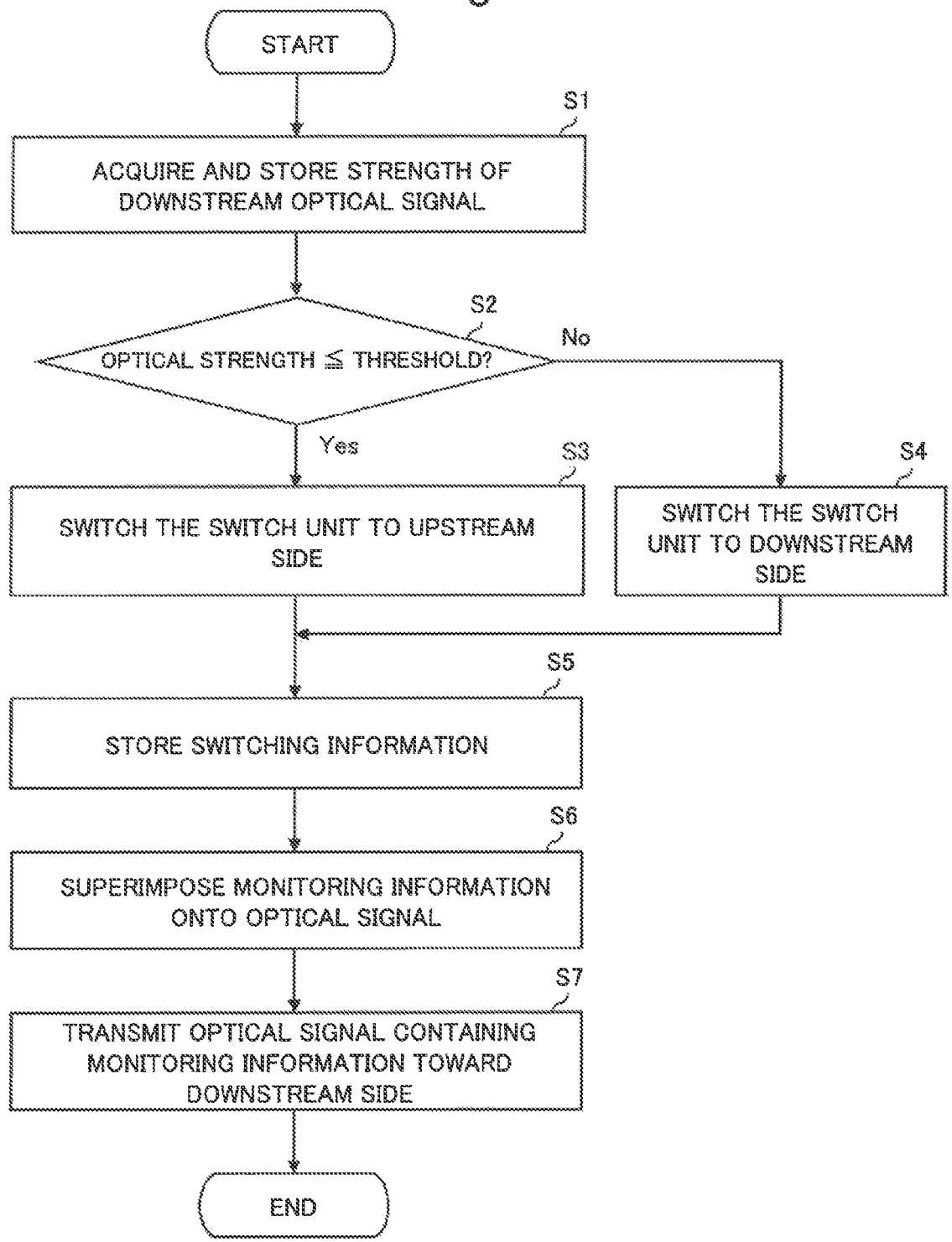
FIG. 7 is a flowchart illustrating an example of a control operation related to transmission of monitoring information in the relay device (repeater) according to the fourth example embodiment.

An example control operation related to transmission of the monitoring information of the repeater $26_1$-$26_n$ according to the fourth example embodiment will be described based on FIG. 7.

For example, the monitor unit $38_1$-$38_n$ of the repeater $26_1$-$26_n$ acquires the strength of the downstream optical signal supplied from the optical distributor $49_1$-$49_n$ and stores the information on the strength (step S1). The control unit $51_1$-$51_n$ compares the strength of the downstream optical signal acquired by the monitor unit $38_1$-$38_n$ with a threshold and determines whether the strength of the downstream optical signal is equal to or smaller than the threshold (step S2). When the control unit $51_1$-$51_n$ has determined in the above determination process that the strength of the downstream optical signal is not equal to or smaller than the threshold (No), the control unit $51_1$-$51_n$ switches the switch unit $50_1$-$50_n$ in order that the optical distributor $49_1$-$49_n$ will optically connect to the relay circuit $39_1$-$39_n$. In other words, the control unit $51_1$-$51_n$ switches the switch unit $50_1$-$50_n$ to the downstream side (step S4).

When the control unit $51_1$-$51_n$ has determined in the above determination process that the strength of the downstream optical signal is equal to or smaller than the threshold (Yes), the control unit $51_1$-$51_n$ switches the switch unit $50_1$-$50_n$ in order that the optical distributor $48_1$-$48_n$ will optically connect to the relay circuit $39_1$-$39_n$. In other words, the control unit $51_1$-$51_n$ switches the switch unit $50_1$-$50_n$ to the upstream side (step S3).

The control unit $51_1$-$51_n$ then stores, in a storage (not illustrated), switching information representing the switching state of the switch unit $50_1$-$50_n$ (step S5).

The relay circuit $39_1$-$39_n$ superimposes the monitoring information acquired by the monitor unit $38_1$-$38_n$ onto the optical signal that has flowed through the switch unit $50_1$-$50_n$ (step S6). The relay circuit $39_1$-$39_n$ then transmits the optical signal containing the monitoring information toward the downstream terminal station 21 via the downstream optical transmission path 24 (step S7).

The repeater $26_1$-$26_n$ and its monitoring system according to the fourth example embodiment include the aforementioned configuration, thus can obtain a similar effect to that of the second example embodiment, and further obtain the following effect. Even when the downstream optical signal does not flow through the downstream optical transmission path 24 for example due to a break in the optical fiber, the monitoring information of the repeater 26 downstream of the position of the break in the optical fiber is transmitted to the downstream terminal station 21. This allows the monitoring system according to the fourth example embodiment to monitor continuously the repeater 26, thus the monitoring system can enhance the reliability of the monitoring operation. Further, the monitoring system according to the fourth example embodiment can readily identify the position of a break in the optical fiber based on the monitoring information supplied from the repeater 26, when the downstream optical transmission path 24 has suffered an accident like the break in the optical fiber. This allows the monitoring system according to the fourth example embodiment to reduce the recovery time from occurrence of a fault to its recovery.

Other Example Embodiments

Note that the invention is not limited to the first to fourth example embodiments but may take a variety of other embodiments. For example, as described in the third example embodiment, a configuration where the monitoring information is transmitted to the downstream terminal station 21 as well as the upstream terminal station 22 may provide a configuration including the switch unit described in the fourth example embodiment on the downstream side as well as the upstream side.

While the monitoring unit 30 (46) is built into the terminal station 21 (22) in the second to fourth example embodiments, the monitoring unit 30 (46) may be built into a separate device from the terminal station 21 (22), for example an information processing device.

Figure 8:
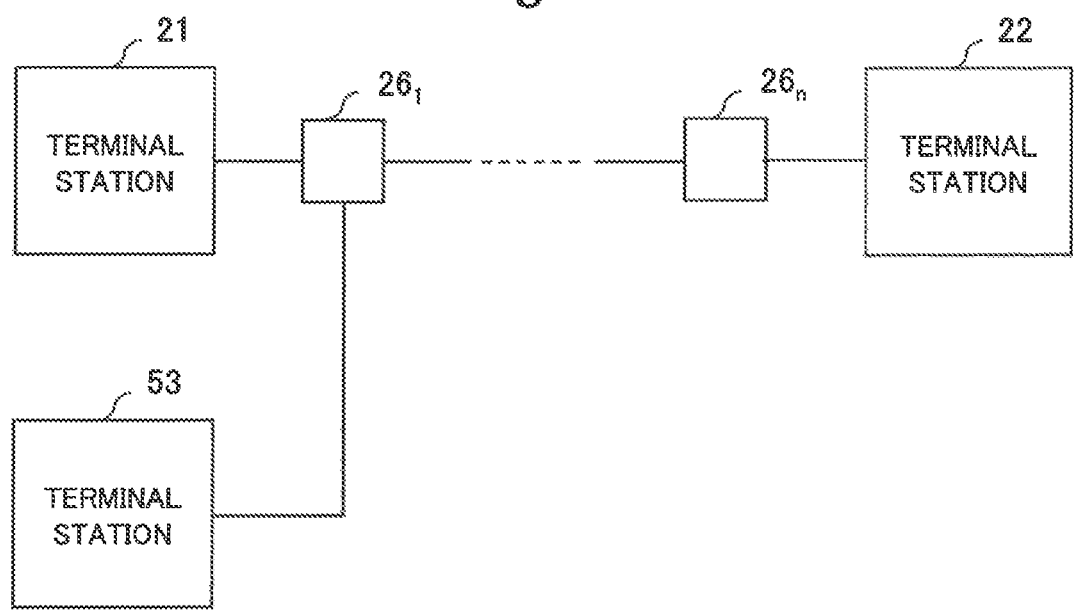
FIG. 8 illustrates another example embodiment of the present invention.
Figure 9:
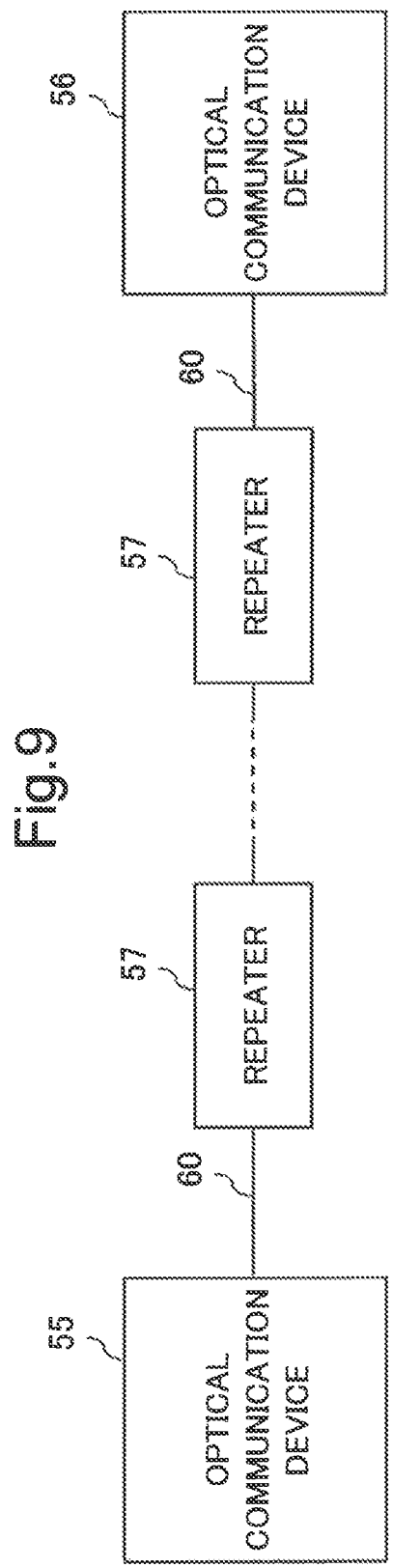
FIG. 9 illustrates an example of an optical transmission system.

In addition, at least one of the repeaters 26 according to the second to fourth example embodiments may be a type called a re-configurable optical add/drop multiplexer (ROADM). Three terminal stations may be connected to the ROADM. Accordingly, for example, it is possible to use a ROADM as the repeater $26_1$ and, as illustrated in FIG. 8, additionally connect, to the repeater $26_1$, a terminal station 53 that is separate from the terminal stations 21, 22. Then the terminal station 53 may be provided with a similar configuration to that of the downstream terminal station 21. In this example, it is possible to transmit the downstream optical signal also between the terminal station 22 and the terminal station 53. Thus, the monitoring information of the repeater $26_1$-$26_n$ can be transmitted to the additional terminal station 53 and the terminal station 53 can monitor the repeater $26_1$-$26_n$. In this way, the monitoring system may be configured to transmit the monitoring information to three or more terminal stations. Such the configuration monitors the repeater $26_1$-$26_n$ by using an increased number of terminal stations (monitoring units), which enhances the reliability of the monitoring system.

The invention has been described while using the aforementioned example embodiments as models. However, the invention is not limited to the aforementioned example embodiments. In other words, the invention may apply a variety of embodiments understood by those skilled in the art within the scope of the invention.

The present application claims priority based on Japanese Patent Application No. 2016-131470, filed on Jul. 1, 2016, the entire disclosure of which is incorporated herein.

REFERENCE SIGNS LIST

1 Relay device
2 Superimposing unit
3, $38_1$-$38_n$ Monitor unit
5 Monitoring system
7, 8, 21, 22 Terminal station
10, 23, 24 Optical transmission path
12 Extraction unit
13, 30, 46 Monitoring unit
26 Repeater
32 Demodulation circuit
40, 43 Superimposing circuit
41, 44 Oscillator
50 Switch unit
51 Control unit

What is claimed is:

1. A monitoring system comprising:
   a plurality of relay devices;
   one of the plurality of relay devices including:
   a monitor that monitors an operation status of the one of the plurality of relay devices; and
   a superimposing circuit that superimposes monitoring information indicating the operation status acquired by the monitor onto an optical signal of a primary signal at a predetermined timing by modulation processing based on an oscillation signal having a predetermined oscillation frequency, the primary signal being the optical signal which flows through an optical transmission path between terminal stations as optical communication devices that transmit and receive the optical signal,
   wherein the predetermined oscillation frequency is different for each of the plurality of relay devices.

2. The monitoring system according to claim 1,
   wherein an upstream optical transmission path that passes an upstream optical signal flowing from the terminal station on one side to the terminal station on the other side and a downstream optical transmission path that passes a downstream optical signal flowing in the opposite direction to the upstream optical signal are arranged between the terminal stations, and
   wherein the superimposing circuit superimposes the monitoring information onto one or both of the upstream optical signal and the downstream optical signal of the primary signal.

3. The monitoring system according to claim 1 further comprising:
   an extraction circuit that extracts the monitoring information from the optical signal containing the monitoring information of the one of the plurality of relay devices superimposed through passing the one of the plurality of relay devices; and
   a monitoring apparatus that monitors the one of the plurality of relay devices based on the monitoring information extracted by the extraction circuit.

4. The monitoring system according to claim 3,
wherein the plurality of the relay devices are interposed between the terminal stations,
wherein the extraction circuit of the monitoring device extracts the monitoring information of each of the plurality of relay devices separately from each other based on a difference in the oscillation frequency, and
wherein the monitoring apparatus monitors the plurality of the respective relay devices based on the respective pieces of monitoring information.

5. The monitoring system according to claim 4,
wherein the monitoring apparatus is built into or connected to the terminal station.

6. A monitoring system comprising:
a plurality of relay devices;
one of the plurality of relay devices including:
a monitor that monitors an operation status of the one of the plurality of relay devices;
a superimposing circuit that superimposes monitoring information indicating the operation status acquired by the monitor onto an optical signal of a primary signal at a predetermined timing by modulation processing based on an oscillation signal having a predetermined oscillation frequency, the primary signal being the optical signal which flows through an optical transmission path between terminal stations as optical communication devices that transmit and receive the optical signal;
a connection path for connecting an upstream optical transmission path and a downstream optical transmission path via a switch circuit, the upstream optical transmission path and the downstream optical transmission path being arranged between the terminal stations, the upstream optical transmission path passing an upstream optical signal flowing from the terminal station on one side to the terminal station on the other side, the downstream optical transmission path passing a downstream optical signal flowing in the opposite direction to the upstream optical signal; and
a controller that controls the switch circuit so as to guide the upstream optical signal to the downstream optical transmission path via the switch circuit and the connection path when detecting that the strength of the downstream optical signal has become equal to or smaller than a threshold,
wherein the superimposing circuit further comprises a configuration to superimpose the monitoring information onto the downstream optical signal of the primary signal flowing through the downstream optical transmission path, or onto the upstream optical signal guided to the downstream optical transmission path via the switch circuit and the connection path when the strength of the downstream optical signal is less than or equal to a threshold.

7. A method for transmitting monitoring information, comprising:
monitoring an operation status of one of a plurality of relay devices that relays an optical signal flowing through an optical transmission path between terminal stations as optical communication devices that transmit and receive the optical signal;
superimposing monitoring information based on the monitoring operation onto the optical signal of a primary signal at a predetermined timing by performing modulation processing based on an oscillation signal having a predetermined oscillation frequency, the primary signal being the optical signal which flows through an optical transmission path between terminal stations; and
transmitting the optical signal containing the monitoring information toward a monitoring apparatus to monitor the one of the plurality of relay devices,
wherein the predetermined oscillation frequency is different for each of the plurality of relay devices.

* * * * *